United States Patent
Ouyang et al.

(10) Patent No.: US 7,530,706 B2
(45) Date of Patent: May 12, 2009

(54) LED LIGHTING APPARATUS WITH FAST CHANGING FOCUS

(76) Inventors: Chieh Ouyang, No. 36, Lane 130, Yixin 1st St., Yangmei Town, Taoyuan County 326 (TW); Wei Ouyang, 1F., No. 12, Alley 49, Lane 115, Sec. 2, Chenggong Rd., Neihu District, Taipei City 114 (TW)

( * ) Notice: Subject to any disclaimer, the term of this patent is extended or adjusted under 35 U.S.C. 154(b) by 0 days.

(21) Appl. No.: 11/509,785

(22) Filed: Aug. 25, 2006

(65) Prior Publication Data

US 2008/0062505 A1 Mar. 13, 2008

(51) Int. Cl.
*F21L 4/00* (2006.01)
(52) U.S. Cl. .................... 362/187; 362/188; 362/800
(58) Field of Classification Search ........... 362/231, 362/187, 188, 191, 202, 372, 551, 555, 581, 362/800
See application file for complete search history.

(56) References Cited

U.S. PATENT DOCUMENTS 6,648,495 B1 * 11/2003 Hsu ........................... 362/545
7,083,298 B2 * 8/2006 Pritchard et al. ............ 362/184
7,204,606 B2 * 4/2007 Brass et al. ................. 362/231

FOREIGN PATENT DOCUMENTS

CN PRC03224922.5 7/2004

OTHER PUBLICATIONS

Extracted from the website: http://www.wolf-eyes.com/Wolf-Eyes/default.htm.

* cited by examiner

*Primary Examiner*—William C Choi
*Assistant Examiner*—Jack Dinh
(74) *Attorney, Agent, or Firm*—Rosenberg, Klein & Lee

(57) ABSTRACT

A light-emitting diode (LED) lighting apparatus includes a main body, a light-emitting diode and a convex lens. The distance between the LED and the convex lens is less than two times of the focal length of the convex lens. When distance between the LED and the convex lens is changed, beam angle is fast changed so that the brightness for long distance is increased and illumination scope for short distance is increased without using a reflective cone.

10 Claims, 3 Drawing Sheets

LED LIGHTING APPARATUS WITH FAST CHANGING FOCUS

BACKGROUND OF THE INVENTION

1. Field of the Invention

The present invention relates to a lighting apparatus, and in particular to a light-emitting diode (LED) lighting apparatus with fast changing focus which is applied to a variety of lighting device, such as an exhibition light.

2. Description of Related Art

Flashlights are widely used portable lighting apparatus in everyday life. In prior art, an adjustable flashlight can emit light beams with different intensity or different effective illumination distance by adjusting the position of light bulb with respect to reflective cone. However, lighting intensity and effective illumination distance of lighting apparatus are limited so that it cannot meet all requirements. When the light emitting diodes (LEDs) are used as light sources, the reflective cone and total internal reflection lens are adopted to focus light. However, the reflective cone and total internal reflection lens cannot achieve the function of adjusting the light distance. In addition, the reflective cone and total internal reflection lens restrict the adjusting distance so that the adjustable angle is small and the light beams cannot be adjusted with a wide angle.

China Patent Application No. CN3224922.5 published on Apr. 28, 2004 discloses an adjustable flashlight including a housing, a light bulb support connected with the housing, a light bulb positioned at the light bulb support, a reflective cone and a helmet. A switch is positioned at the housing of the adjustable flashlight, and the light bulb is electrically connected with the switch. A light emitting diode is positioned in vicinity of through hole of the reflective cone. Positive electrode and negative electrode of the LED are electrically connected with positive plate and negative plate respectively. The positive plate is in contact with positive electrode of power, and the negative plate is in contact with the housing of the adjustable flashlight. Effective illumination distance of the adjustable flashlight is adjusted by the position of the light bulb.

However, the adjustable flashlight described above utilizes the light bulb and the LED as light source, and the effective illumination distance is adjusted by different light source so that the structure of the adjustable flashlight is complicated and effective illumination distance is limited. When the effective illumination distance is adjusted from a small distance to approximately 30 meters, such as a night combat, a street battle, an upstairs-to-downstairs battle, or a floor-to-floor battle for soldiers and policemen that require a long distance focus, if the light is not focus the light is too weak to the soldiers and the policemen see anything. When the soldiers and the policemen execute a short distance battle, such as entering the floor, the stair, or the door, the light is focus on and the visional range is small so that a wide angle light source is required. In addition, the light flare produced by light beam reflected by reflective cone easily has the unbalance brightness symptom that it is bright in the center area and it is dark in the outer area. Therefore, a circular flare is formed.

Thus, there is a need for a lighting apparatus.

SUMMARY OF THE INVENTION

It is an object of the present invention to provide a light-emitting diode (LED) lighting apparatus with fast changing focus which is applied to a variety of lighting device.

The characteristic of convex lens are in the following:

1. Light beams which are traveling parallel to the principal axis are refracted by the convex lens so that light beams are focused at one point on the opposite side of the convex lens.

2. If light beams are traveling through center of the convex lens, then light beams will not be refracted.

3. After Light beams are traveling through the focal point of the convex lens and refracted by the convex lens, the light beams are traveling parallel to the principal axis.

4. Light beams traveling through the convex lens are converged.

5. Imagine formation by convex lens (f is focal length):

If object is placed at an infinite distance from the convex lens, then image is formed at the focal point on the opposite side of the convex lens.

If the distance between the object and the convex lens is larger than two times of the focal length (2 f), then size of the image is decreased and the image is formed at a distance between f and 2 f of the principal axis.

If the distance between the object and the convex lens is equal to two times of the focal length (2 f), then size of the image is remained and the image is formed at a distance equal to 2 f on the opposite side of the convex lens.

If the distance between the object and the convex lens is less than 2 f and more than f, then size of the image is larger and the image is formed at a distance larger than 2 f on the opposite side of the convex lens.

If the distance between the object and the convex lens is equal to f, then the image is formed at an infinite distance.

If the distance between the object and the convex lens is less than f, then the image is formed one the same side of the convex lens.

According to the present invention, the LED is a single light source, and a convex lens is positioned in front of the LED. When changing focus, the convex lens is moved back and forth with respect to the LED without using reflective cone. Thus, the lighting apparatus of the present invention is compact, and has a brighter long-distance intensity and wider short-distance intensity, and convenient to change focus.

To achieve the objects of the present invention, the present invention provides a light-emitting diode (LED) lighting apparatus with fast changing focus. The present invention includes a main body, a light-emitting diode and a convex lens. A power source is positioned within the main body, and the light-emitting diode is electrically connected with the power source and positioned at front end of the main body. The convex lens is positioned in front of the light-emitting diode and is moved back and forth with respect to the light-emitting diode. The distance between the LED and the convex lens is within two times of the focal length of the convex lens.

BRIEF DESCRIPTION OF THE DRAWINGS

The present invention can be fully understood from the following detailed description and preferred embodiment with reference to the accompanying drawings, in which.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
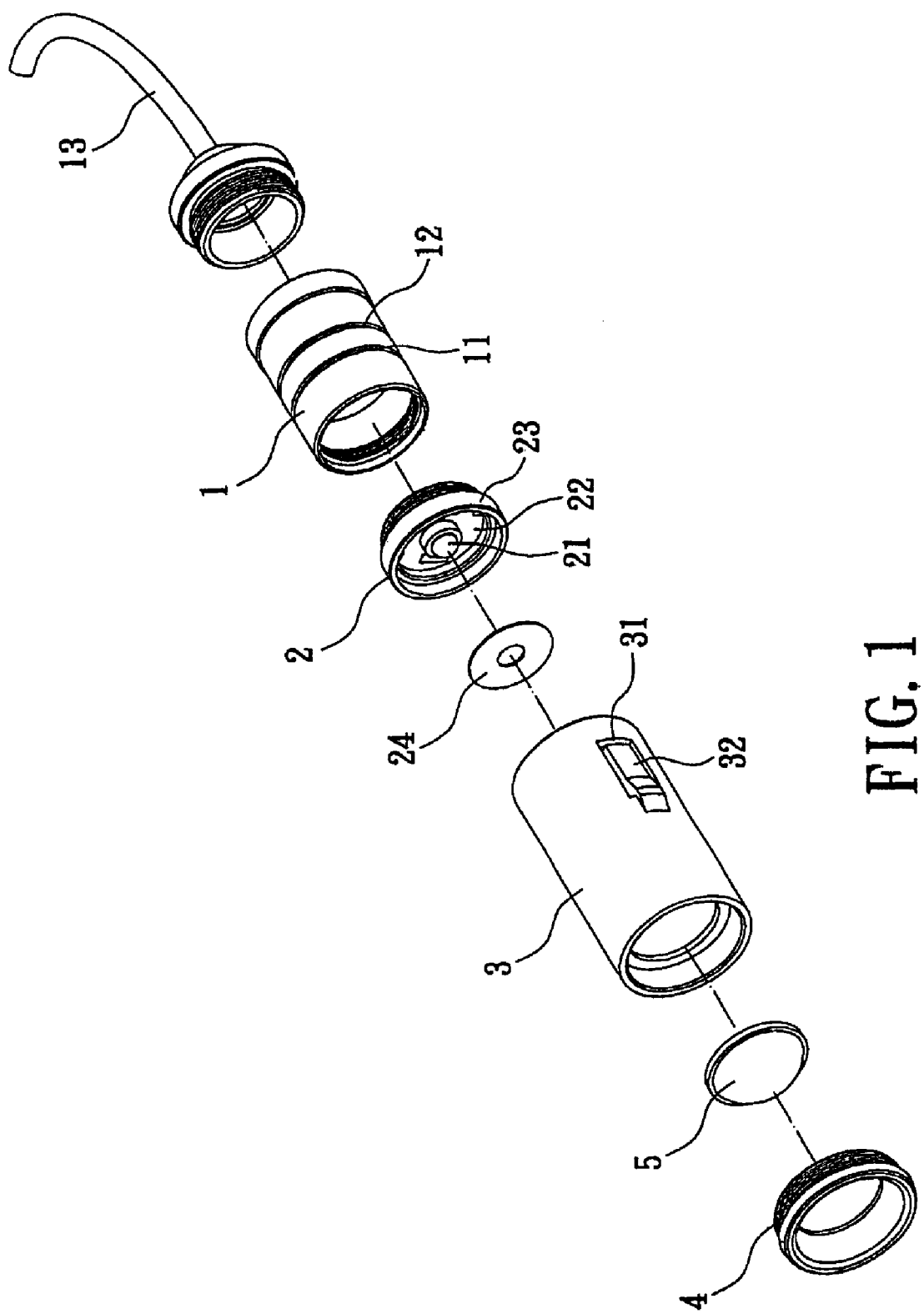
FIG. 1 is an exploded view of the first embodiment of the present invention.

Referring to FIG. 1, the present invention provides a light-emitting diode (LED) lighting apparatus with fast changing focus. The present invention includes a main body 1, a light-emitting device 2, a housing 3, a cap 4 and a convex lens 5. A power source (not shown) is positioned within the main body 1 and includes a battery clip and at least one battery. A first receiving groove 11 and a second receiving groove 12 are positioned at outer surface of the main body 1, and a supporting frame 13.

The light-emitting device 2 includes a printed circuit board 22, and a light-emitting diode (LED) 21 is positioned at front end of the printed circuit board 22. Because the LED 21 has epoxy resin on its outer surface, the LED 21 is used to converge light beams. A reflective layer 24 is attached to the front end of the printed circuit board 22 so as to reflect light beams, and a conductive plate (not shown) is positioned at rear end of the printed circuit board 22. The printed circuit board 22 is positioned at a mounting frame 23, and the mounting frame 23 is positioned in vicinity of the front end of the main body 1 so that the light-emitting device 2 is positioned at the main body 1. The LED 21 is electrically connected with the power source (not shown) through the printed circuit board 22 and the conductive plate (not shown).

The housing 3 is cylindrical and the cap 4 is positioned in front of the housing 3. The convex lens 5 is positioned between the cap 4 and the housing 3, and the reflective plate 24 is positioned between the LED 21 and the convex lens 5. The convex lens 5 can be a single convex lens or a double convex lens. According to the embodiment of the present invention, a surface of the convex lens 5 confronting to the LED 21 is a flat plane, and the other surface of the convex lens is a concave surface. The convex lens 5 is positioned at optical pathway of light beams of the LED 21, and a longitudinal groove 31 is positioned at lower portion of the housing 3. A switch button 32 is adapted to be received at the longitudinal groove 31 and is L-shaped. The switch button 32 can be moved so that the switch button 32 is held by the first receiving groove 11 or the second receiving groove 12.

Figure 2:
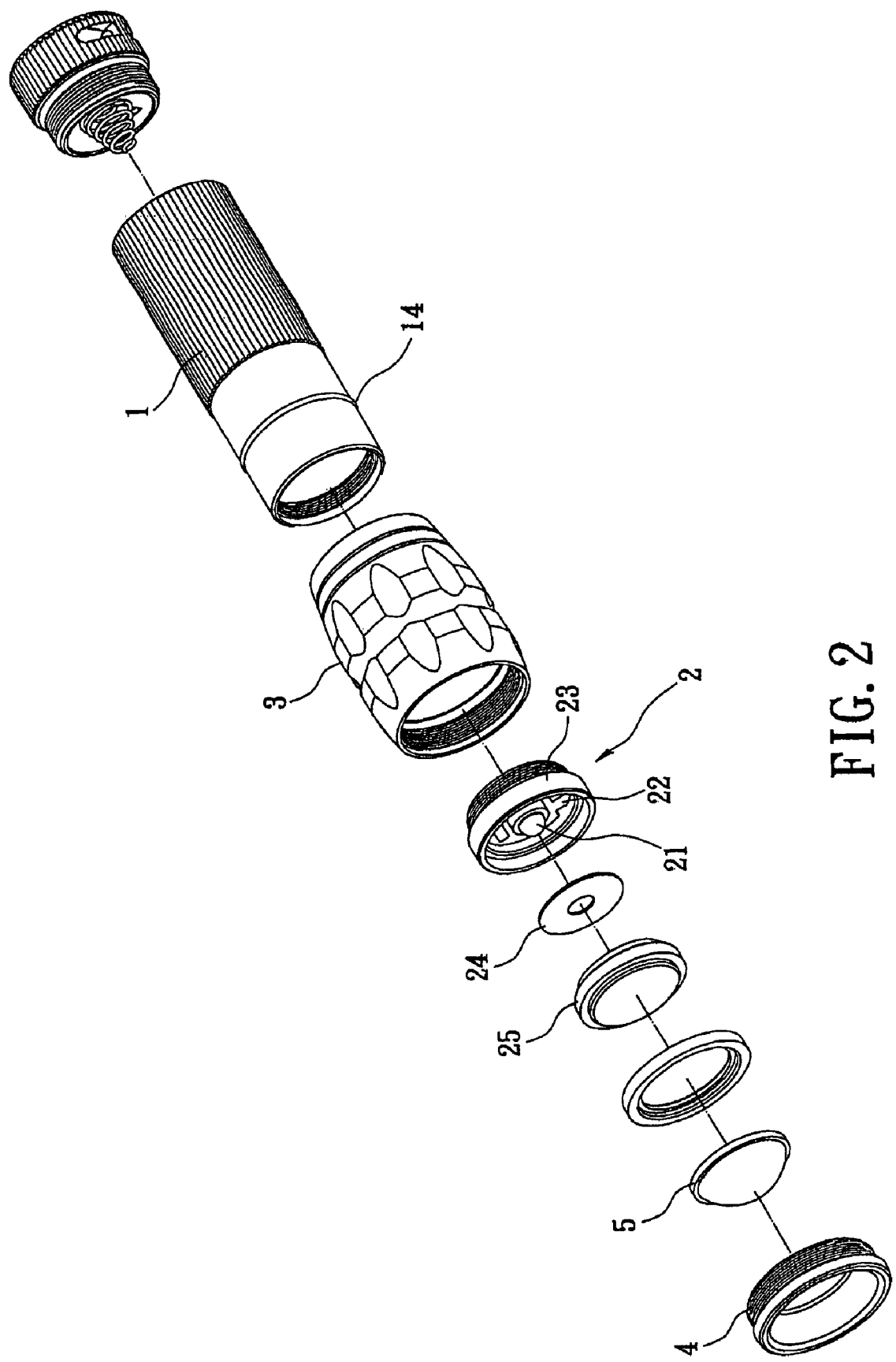
FIG. 2 is an exploded view of the second embodiment of the present invention.

According to the second embodiment of the present invention (as shown in FIG. 2), the housing 3 is slidably positioned at the main body 1. A water-proof damping ring 14 is positioned at the main body 1 so that the housing 3 is held by frictional force between the housing 3 and the water-proof damping ring 14. To prevent the housing 3 from falling off along the main body 1, the mounting frame 23 is positioned at the main body 1 by screws, and diameter of the front end of the mounting frame 23 is larger than inner diameter of the rear end of the housing 3 so that the mounting frame 23 abuts at the housing 3.

Figure 3:
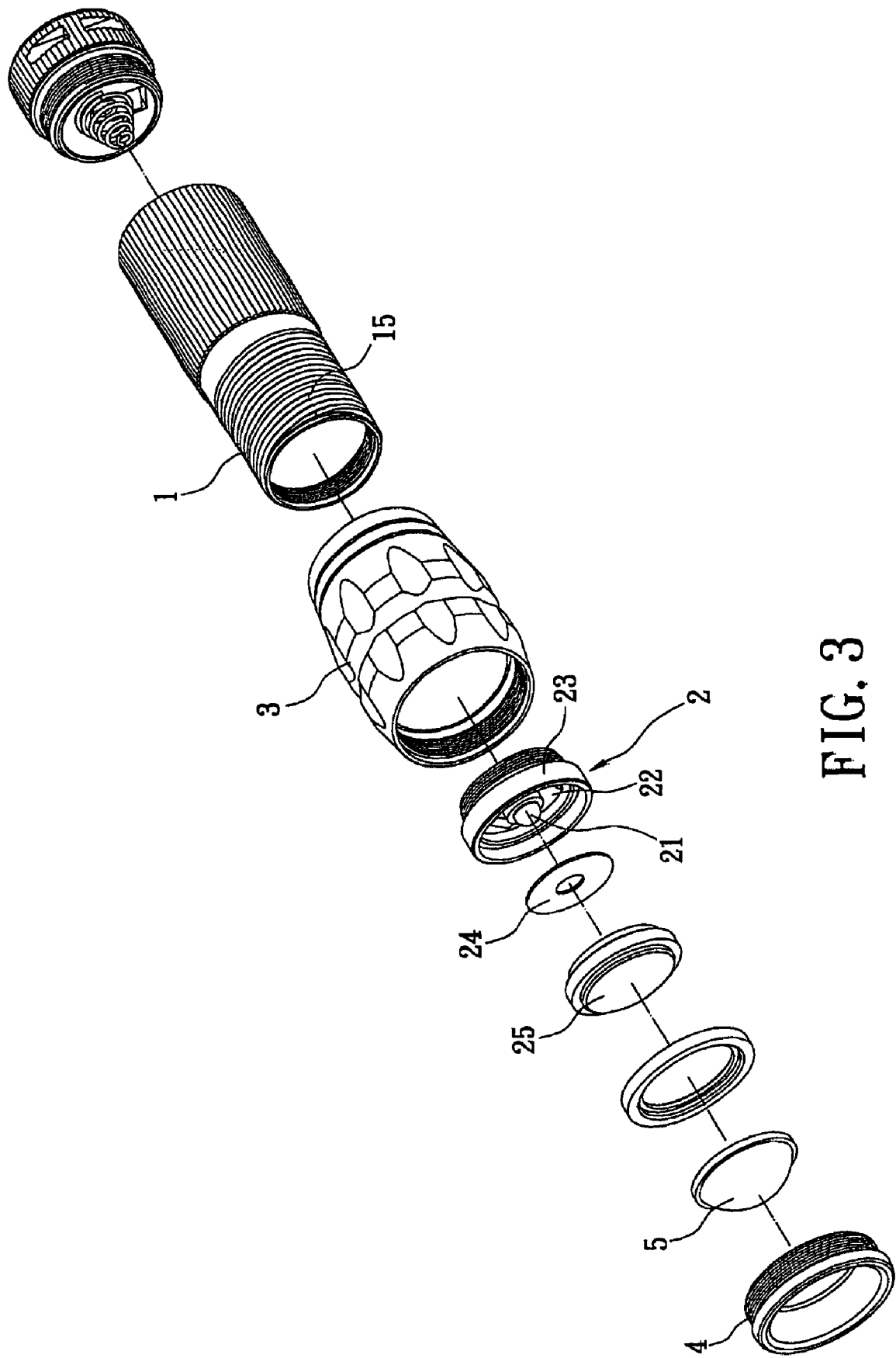
FIG. 3 is an exploded view of the third embodiment of the present invention.

According to the third embodiment of the present invention (as shown in FIG. 3), the housing 3 meshes the main body 1 by fast thread 15. To prevent the housing 3 from falling off along the main body 1, the mounting frame 23 is positioned at the main body 1 by screws, and diameter of the front end of the mounting frame 23 is larger than inner diameter of the rear end of the housing 3 so that the mounting frame 23 abuts at the housing 3.

As shown in experiment data below, two convex lenses are used. Diameters of the two convex lenses are 38 mm and 22.8 mm respectively. When the distance between the object and the convex lens is 5 m, the image is focused at the other side of the convex lens and the diameter of the image is 35 cm if diameter of the convex lens is 38 mm, or the diameter of the image is 40 cm if the diameter of the convex lens is 22.8 mm. When the distance between the object and the convex lens is 30 m, then the image is focused at the other side of the convex lens and the diameter of the image is 1.1 m if the diameter of the convex is 38 mm, or the diameter of the image is 2 m if the diameter of the convex lens is 22.8 mm.

Experiment data:

| Diameter of lens | Best distance of focus | Diameter of Image when distance between the object and the lens is 5 m | Diameter of Image when distance between the object and the lens is 30 m |
| --- | --- | --- | --- |
| 22.8 m | 13 mm | 40 cm | 2 m |
| 38 mm | 32 mm | 35 cm | 1.1 m |

The light beams are focused by the LED 21 so that beam angle is about 140°. The convex lens 5 is moved by a distance within two times of focal length of the convex lens 5. When the distance between the light source and the convex lens is changed, beam angle of light beams from the convex lens 5 ranges from 6° to 120°. In addition, because the diameters of the convex lens 5 are different, proper distance is within two times of focal length of the convex lens 5. It is more faster to change focus of the convex lens 5.

For example, the diameter of the convex lens is 22.8 mm. Light beams from the LED 21 are focused by an epoxy resin layer so the beam angle is about 140°. When the distance between the LED 21 and the convex lens 5 is 0 mm (the switch button 32 is held by the second receiving groove 12), beam angle is about 120° and the light beams are diverging beams after the light beams are refracted. The light beams are focused in front of the convex lens 5 by 3 m, and the diameter of the image is about 3 m. The housing 3 is pulled so that the distance between the LED 21 and the convex lens 5 is within two times of the focal length of the convex lens 5 (the switch button 32 is held by the first receiving groove 11). After the light beams are refracted by the convex lens 5, beam angle is about 6° and the light beams are focused in front of the convex lens 5 by 5 m. The diameter of the image is 40 m. If the light beams are focused in front of the convex lens by 30 m, then diameter of the image is about 2 m.

According to the present invention, light beams from the LED 21 are focused twice so that light beams are converged (the distance from the light source is within two times of the focal length of the convex lens 5) and diverged (the distance from the light source to the convex lens 5 is 0). The LED 21 is moved with respect to the convex lens 5 (the distance ranges from 0 to 32 mm), and beam angle is changed (ranging from 120° to 6°) so the brightness for long distance is increased and illumination scope for short distance is increased. The present invention does not need reflective cone and has a large range of light beams and quick to adjust the focal length of the lens.

Furthermore, when the switch button 32 is held by the first receiving groove 11 of the main body 1, the light beams are focused within two times of the focal length of the convex lens 5. That is, the distance between the LED 21 and the convex lens 5 is maximum and the beam angle is about 6°. And, the distance to change focus is 13 mm. When the switch button 32 is held by the second receiving groove 12 of the housing 1, the distance between the LED 21 and the convex lens 5 is 0 and the beam angle is about 120°. Due to change of distance from the light source to the convex lens, the beam angle ranges from 6° to 120°. When the distance between the light source and the convex lens is within two times of focal length of convex lens, the light beams are diverged. When the distance is changed, the light beams are becoming from diverging to converging or from converging to diverging.

According to the present invention, they produce optimal beams—no dark holes, rings, hot spots, or shadows when the lighting apparatus is in use so the present invention is widely used in flashlights, tactical light, table lamps, search lights, projection lights or exhibition lights. Changing focus depends on how far is the object. According to the present invention, the housings are movable with respect to the main body and the LEDs are not moveable. If the housings are not movable and the LEDs are movable, then distance between them are adjusted so as to change focus.

While the invention has been described with reference to the preferred embodiments, the description is not intended to be construed in a limiting sense. It is therefore contemplated that the appended claims will cover any such modifications or embodiments as may fall within the scope of the invention defined by the following claims and their equivalents.

What is claimed is:

1. A light-emitting diode (LED) lighting apparatus, comprising:
   a main body having a power source;
   a light-emitting diode electrically connected with the power source and positioned at a front end of the main body, the light-emitting diode emitting light beams;
   a collar coaxially coupled to the main body;
   a convex lens coupled to the collar and optically coupled to the light-emitting diode in coaxially displaceable manner relative thereto, the convex lens defining a predetermined focal length, said convex lens being selectively displaceable between a first range and a second range, said first range being from the light-emitting diode to a first position offset from the light-emitting diode by the predetermined focal length, said second range being from the first position to a second position offset from the light-emitting diode by twice the predetermined focal length; and
   at least one of said main body and collar having a pair of annular engagement portions axially offset one from the other for releasably locking said collar to the main body to locate the convex lens respectively in said first range and second range;
   whereby brightness of the light is optimally maintained for a greater range of illumination when the convex lens in said second range than in said first range.

2. The light-emitting diode (LED) lighting apparatus as claimed in claim 1, wherein the convex lens is configured to converge light beams from the LED.

3. The light-emitting diode (LED) lighting apparatus as claimed in claim 1, wherein the convex lens is of a type selected from the group consisting of: a single convex lens or a double convex lens.

4. The light-emitting diode (LED) lighting apparatus as claimed in claim 1, wherein the main body has a fast thread formed thereon for retentive engagement by a housing displaceably coupled to the main body, the housing having the convex lens coupled thereto.

5. The light-emitting diode (LED) lighting apparatus as claimed in claim 1, wherein the distance between the LED and the convex lens is adjustable with an approximate range of 0mm to 32mm.

6. The light-emitting diode (LED) lighting apparatus as claimed in claim 1, wherein a damping ring is formed about an outer surface of the main body to protrude annularly therefrom.

7. The light-emitting diode (LED) lighting apparatus as claimed in claim 1, further comprising a housing coaxially coupled in slidable manner to the main body, the housing telescopically receiving the main body and frictionally engaging the damping ring.

8. The light-emitting diode (LED) lighting apparatus as claimed in claim 1, wherein said collar and main body are coupled to be linearly displaceable one relative to the other without rotation between said engagement portions.

9. The light-emitting diode (LED) lighting apparatus as claimed in claim 1, wherein said engagement portions define discrete operational settings for said collar relative to said main body, said collar and main body being operably secured for stable operation exclusively at said operational settings.

10. The light-emitting diode (LED) lighting apparatus as claimed in claim 1, wherein said convex lens in the first range diverges the light beams from said light-emitting diode, and said convex lens in the second range converges the light beams from said light-emitting diode.

* * * * *